(12) United States Patent
Hazard

(10) Patent No.: US 10,296,310 B1
(45) Date of Patent: May 21, 2019

(54) EVOLUTIONARY PROGRAMMING TECHNIQUES UTILIZING CONTEXT INDICATIONS

(71) Applicant: Diveplane Corporation, Raleigh, NC (US)

(72) Inventor: Christopher James Hazard, Durham, NC (US)

(73) Assignee: Diveplane Corporation, Raleigh, NC (US)

( * ) Notice: Subject to any disclaimer, the term of this patent is extended or adjusted under 35 U.S.C. 154(b) by 19 days.

(21) Appl. No.: 15/724,637

(22) Filed: Oct. 4, 2017

(51) Int. Cl.
*G06F 9/44* (2018.01)
*G06F 8/41* (2018.01)
*G06F 8/70* (2018.01)

(52) U.S. Cl.
CPC . *G06F 8/43* (2013.01); *G06F 8/70* (2013.01)

(58) Field of Classification Search
CPC .. G06F 17/30864; G06F 11/3616; G06F 8/36; G06F 8/72; G06F 8/77
See application file for complete search history.

(56) References Cited

U.S. PATENT DOCUMENTS

| | | | | |
|---|---|---|---|---|
| 6,282,527 B1* | 8/2001 | Gounares | ............... | G06N 3/126 706/13 |
| 6,741,974 B1* | 5/2004 | Harrison | ............... | G06N 5/022 706/13 |
| 2001/0049595 A1* | 12/2001 | Plumer | ................. | G06Q 10/00 703/22 |
| 2005/0137992 A1* | 6/2005 | Polak | ....................... | G06F 8/30 706/13 |
| 2008/0307399 A1* | 12/2008 | Zhou | ..................... | G06N 3/126 717/141 |
| 2009/0006299 A1* | 1/2009 | Baum | .................... | G06N 20/00 706/46 |
| 2009/0144704 A1* | 6/2009 | Niggemann | ............. | G06F 8/24 717/124 |
| 2010/0287527 A1* | 11/2010 | Mitchell | ................... | G06F 8/10 717/104 |
| 2011/0060895 A1* | 3/2011 | Solomon | ................... | G06F 8/36 713/1 |
| 2013/0339365 A1* | 12/2013 | Balasubramanian | ..... | G06F 8/71 707/741 |

* cited by examiner

Primary Examiner — Duy Khuong T Nguyen
(74) Attorney, Agent, or Firm — Dority & Manning, P.A.

(57) ABSTRACT

Techniques are provided for determining labels associated with first and second candidate code and whether those labels are compatible based at least in part on the labels. When the first candidate code and the second candidate code are compatible, third candidate code based is determined on the those two. When the third candidate code meets exit criteria the third candidate code is provided as evolved code. Some embodiments also include causing execution of the evolved code.

17 Claims, 4 Drawing Sheets

EVOLUTIONARY PROGRAMMING TECHNIQUES UTILIZING CONTEXT INDICATIONS

FIELD OF THE INVENTION

The present invention relates to computer-based optimization and artificial intelligence techniques and in particular to evolutionary programming techniques utilizing context indications.

BACKGROUND

Evolutionary programming techniques often work well because they combine and/or modify code in ways that programmers would not have thought of or chosen to experiment with. Generally, though, evolutionary programming techniques perform with little or no knowledge of or guidance related to the context of the programs that are being combined and/or modified. As such, these techniques lack the ability to make evolutionary programming changes based on those known aspects and may take too long to evolve code in a beneficial manner.

For example, evolutionary programming techniques may be used to evolve a set of programs that, at least in part, calculate a sine function. In general, the evolutionary programming technique might combine two programs, but not know where the sine function calculation is located within the code. As such, it may evolve the sine function based on a combination of the sine function in one set of code with code that calculates something other than the sine function from the other set of code. As such, the result is less likely to result in a beneficial outcome (e.g., a better functioning or "higher fitness" program, by whatever measure might be appropriate). Even if the evolutionary programming technique uses a code-matching algorithm to attempt to find portions of the code that are similar between the two programs, it might fail. For example, even assuming that the code-matching algorithm did find the closest code segments between two programs, depending on the implementation, the code for calculating sine in the first program may actually be more similar to the code for calculating cosine in the second program that it is to the code for calculating sine in the second program. As such, the evolutionary programming technique that used this matching might combine and evolve the code for calculating sine with the code for calculating cosine.

As used herein, "code", "set of code" or "code set" are broad terms, encompassing numerous embodiments, including, without limitation, full programs (whether compilable, interpretable, executable, or the like), portions of programs, libraries, context-action pairs, data and data structures, and the like.

Techniques herein address these issues.

SUMMARY

Techniques are provided for evolutionary programming techniques using context indications, including determining a first label associated with functionality of first candidate code; determining a second label associated with functionality of second candidate code; and determining whether the first candidate code and second candidate code are compatible for evolution based at least in part on the first label and the second label. When the first candidate code and the second candidate code are determined to be compatible for evolution based at least in part on the comparison of the first label and second label, third candidate code is evolved using evolutionary programming techniques, based on the first candidate code and second candidate code, wherein the third candidate code differs from both the first candidate code and second candidate code, and contains no more than a subset of code from each of the first candidate code and the second candidate code. A fitness test is then performed based at least in part on the third candidate code; and a determination is made whether exit criteria are met based at least in part on the fitness test. When the exit criteria are met, the third candidate code is provided as evolved code and causing execution of the evolved code.

In some embodiments, the techniques further comprise determining a resultant program based at least in part on the third candidate code; determining whether the exit criteria are met based at least in part on the resultant program; and if the exit criteria are met, providing the resultant program as an evolved program. In some embodiments, the techniques further comprise, when the first candidate code and second candidate code are not compatible, evolving the third candidate code based at least in part on first candidate code without the second candidate code. In some embodiments, the techniques further comprise determining whether the second label does not occur in a first candidate executable program associated with the first candidate code; and when the second label does not occur in the first candidate executable program, determining the resultant program based at least in part on the second candidate code.

In some embodiments, determining whether the first label and the second label are compatible comprises determining a premetric based at least in part on the first label and the second label; determining whether there is an exact match between the first label and the second label; and/or determining a measure of compatibility based on the first label, the second label, the first candidate code, and the second candidate code In some embodiments, the first candidate code is associated with a first set of two or more labels and the second candidate code is associated with a second set of one or more labels, and determining whether the first candidate code and the second candidate code are compatible comprises determining whether the first set of two or more labels is compatible with the second set of one or more labels.

In some embodiments, the techniques further comprise selecting the first label based at least in part on access control security associated with the second candidate code.

In some embodiments, the resultant program is executable and determining the resultant program comprises determining the resultant program based on the third candidate code and a first candidate executable program associated with the first candidate code; and/or the first candidate code comprises one or more of a first training context-action pair and first candidate executable code.

In some embodiments, determining whether the resultant program meets exit criteria comprises determining whether the resultant program meets exit criteria based at least in part on a fitness measure for the resultant program.

In some embodiments, the first candidate code comprises a first context-action pair comprising two or more first context elements; the second candidate code comprises a second context-action pair comprising two or more second context elements; and evolving the third candidate code based on the first candidate code and second candidate code comprises. When a first context element of the first one or more context elements is different from a corresponding second context element of the second one or more context elements, evolving a third, evolved context element from the first context element and the second context element; and the third candidate code is included in the third, evolved context element.

DETAILED DESCRIPTION

Figure 1:
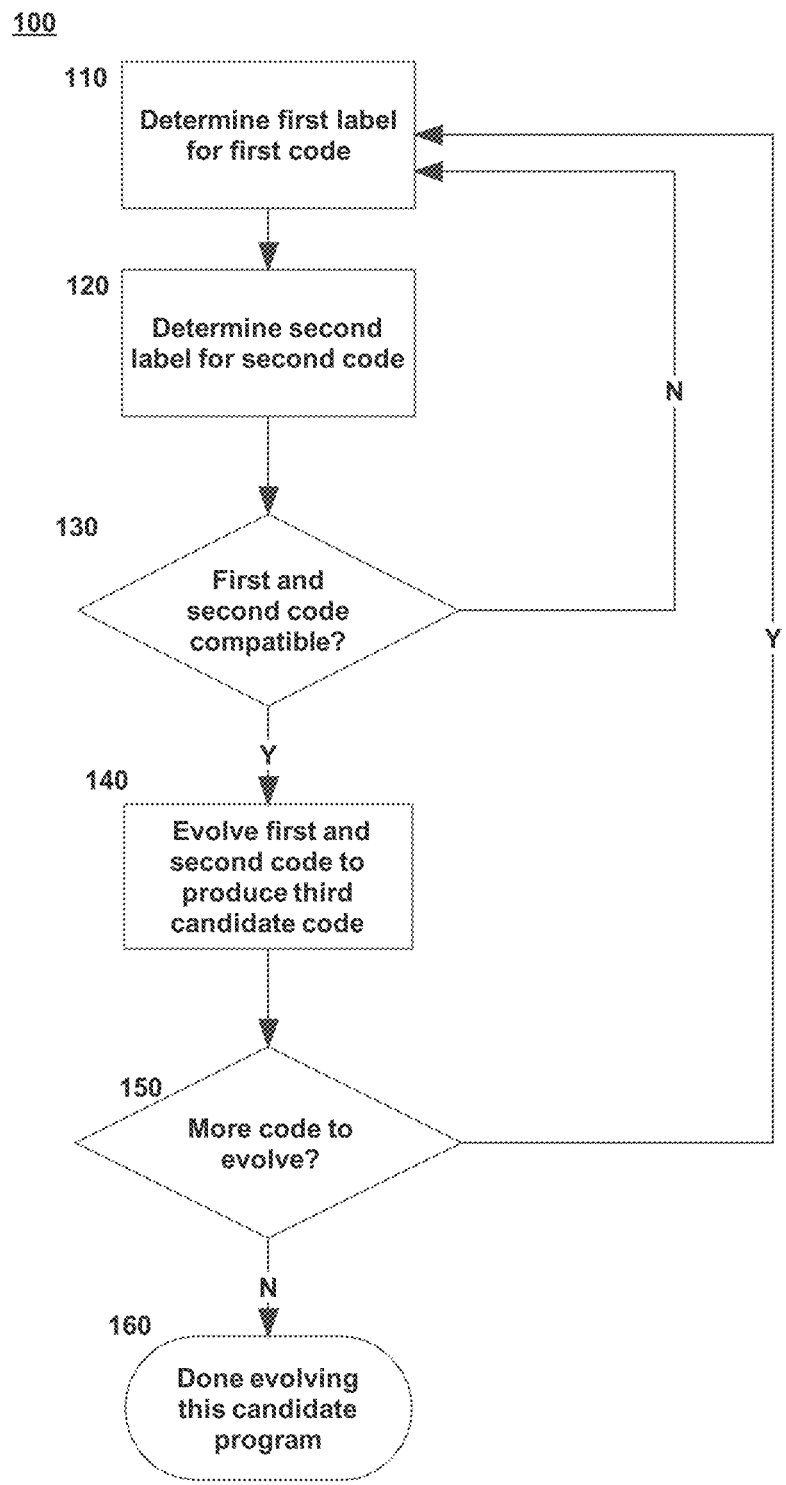
FIG. 1 depicts a process for evolving candidate code utilizing context indications.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The techniques herein use labels or annotations to help guide the code evolution process. Similar or identical labels across multiple programs can, in some embodiments, guide the selection of what code segments to combine either as a rule (e.g., a label must exist and be identical in order to combine/evolve to two corresponding code segments) or as a weight favoring combination (e.g., a label on two code segments may increase the likelihood that two code segments are combined/evolved). Further, the existence of matching labels may also reduce computational time used to compare code segments (e.g., if labels for two code segments match, then the two might be combined without further comparison of the code segments).

As noted, in some embodiments, the techniques herein evolve programs based, at least in part, on labels for portions of code. For example, if it is known that a particular portion of code calculates the result of the sine function, that portion of the code can be demarcated as such, with a modifier such as /SINE at the beginning and \SINE at the end, starting with #SINE and ending with SINE#, #SINE at the top of the relevant portion of the abstract syntax tree, or the like. Since that section of code is labeled, when the evolutionary programming techniques are performed, they can use the label as a signal for what to mix, replace, and modify.

As a more complex example, consider a self-driving mail delivery vehicle's control code. The code for the controller of a self-driving mail delivery vehicle (it might be called, e.g., a "mailcart") may have numerous labeled sections of code such as #turnleft, #turnright, #slowdown, #speedup, and #delivermailright. If there are multiple self-driving mailcart simulators, and each has those five labels (and possibly more), the evolutionary programming techniques herein may combine, modify, replace, and/or evolve the code based, at least in part, on those labels. For example, it may replace the #leftturn from one simulator with that of another, evolve based on one or both of the #leftturn code segments, etc.

As another example, if a new self-driving mailcart controller is being developed and it does not yet have one or more of the sections of code, e.g., it does not have #turnleft, then the techniques herein may perform evolutionary experiments where the code associated with one or more other candidate #turnleft code may be used to experiment with adding code associated with that label to the new self-driving mailcart controller.

The techniques herein can be used to help evolve executable (or compilable, etc.) code as well as context-action pairs for computer-based reasoning systems. For example, staying with the self-driving mailcart example, #turnleftpair may be associated with one or more training context-action pairs, either in the same code set or in multiple code sets. Those #turnleftpair labels associated with training context-action pairs may indicate decisions to be made in certain contexts. If a label is associated with the training context-action pairs, then the labels may be used as described herein to evolve those training context-action pairs.

Various other techniques and embodiments are described herein dealing with required matching vs. suggested matching, hierarchical labels, multiple labelling, security around sharing of labels, using labels to find "nearby" or "close" sections of code, in addition to other techniques and embodiments.

As described more herein, techniques herein, in addition to evolving certain portions of code based on labels may also evolve other portions of code irrespective of labels. Further, evolved code may be tested for fitness, and once exit criteria is met (e.g., a fitness score above a certain threshold, performance of a certain number of iterations or generations of evolution, etc.) the techniques may provide the evolved code for use.

Evolving Candidate Code Utilizing Context Indications

FIG. 1 depicts a process 100 for evolving candidate code utilizing context indications. In process 100, labels for first and second code are determined 110 and 120, and a determination is made whether the two labels are compatible 130. If the labels are compatible 130, then third candidate code is evolved 140 from the first and second code. If there is more 150 code to evolve, then the process determines 110 and 120 more labels, otherwise, process 100 is done 160 evolving candidate code.

In the examples given, two sections of code with corresponding labels are discussed primarily. The techniques herein apply more broadly, however. For example, it is possible that more than two sections of code might be compared, and the resulting code may be evolved 140 based on all of the two or more sections of code. Further, more than one resulting code may be evolved 140. For example, one or more "input" code segments may be evolved 140 to produce two or more "output" segments of code. In addition, a label may apply to be associated with, an entire program (or more than one portion); code, code segments, or a portion of a program; context-action pairs, data, data structures, databases; and the like.

Returning to the top of FIG. 1, determining 110 and 120 labels for first and second candidate code can take many forms. In some embodiments, the labels are placed on sections of code by programmers of the code. In some embodiments, labels can be placed after code is programmed, e.g. by other programmers, smart systems for labelling code, etc. Placed labels may be combined and used with other systems for labelling, such as function names.

The determined 110 and 120 labels correspond to first and second code. The first and second code may be from separate programs, but, in some embodiments, they may be from the same program. For example, if combining two programs, the first and second code may be each be labeled #SINE and may be combined at least in part based on the use of that label. If the first code and second code are from the same program, the labels may still be identical. For example, if code has multiple sections labelled #GRAVITY_CONSTANT, the techniques herein may combine the code based on the use of that same label in the one program. Relatedly, it is possible that a single program will use a label more than once. In some embodiments, if a label is used more than once in the same program, then the techniques herein may use one labeled set of code as the code associated with that label (ignoring, in some respects, the other code associated with that label), and may choose one or the other set of code associated with that label based on some decision criteria, such as shortest or longest code segment, most dislike or alike to other code (e.g., from another program) being combined, first or last occurrence of the label, etc.

Code segments may be associated with more than one label (or no labels at all). For example, one sequence of code may be associated with more than one label, and those labels may be queried simultaneously or separately. If a segment of code is identified with #SINE and #MATH, the segment may match a query for either or both of those labels. As noted above, it is not necessarily the case that all code in a program is associated with a label. Further, code associated with a label may be executable code, a context-action pair or other data, etc. In some embodiments, a program as discussed herein can be a computer program that is executable, interpretable, compilable, etc.

In addition to being associated with code, labels can have or be associated with one or more values, data structure, lists, vectors, matrices, functions, objects, code, and the like. For example, a program may have a section of code labeled with #X, #Y, and #Z, and each of those may be associated with a value. These labels can be compared for compatibility with other labels #X, #Y, and #Z as described herein, but, additionally, determinations can be made based on the values associated with the labels. The values associated with the labels can be compared in any appropriate manner. For example, the property of identity may be required (values for #X, #Y, and #Z must all be exactly some value). In some embodiments, a "premetric" could be determined for the values associated with labels. The term premetric as used herein in this context is a broad one encompassing many meaning and embodiments, including Euclidean distance, Minkowski distance, Damerau-Levenshtein distance, Kullback-Leibler divergence, and/or any other distance measure, metric, psuedometric, premetric, index, and the like. In some embodiments, the premetric requires one or more of the properties of:
  a. symmetry, meaning d(P1, P2)=d(P2, P1), where Pn= (#Xn, #Yn, #Zn) and distance from P1 to P2 is denoted d(P1, P2);
  b. non-negative range, meaning d(P1, P2)>=0;
  c. indiscernible identity, meaning if d(P1, P2)=0, then P1=P2; and
  d. triangle inequality, meaning d(P1, P2)<=d(P1, P2)+d (P2, P3).

In some embodiments, only symmetry and loose non-negative range may be required for a premetric. It may be the case that additionally enforcing indiscernible identity and triangle inequality may allow algorithmic efficiencies, such as reduced computational time. As another example, embodiments using Kullback-Leibler divergence as a premetric may only indiscernible identity and nonnegativity properties may be required.

As another example of a premetric, consider a query on Euclidean distance. A determination could be made that two code segments are "nearby", "close", or "within a threshold distance" (e.g., a first code segment may be associated with #X=1, #Y=1, #Z=0; and a second may be associated with #X=1, #Y=1, and #Z=0.1 would have a Euclidean distance of 0.1 and may satisfy the query). More complicated compatibility measures or queries might also be used, and might be based on multiple labels. For example, returning to the mailcart example, a compatibility measure might be based on code (in this case, e.g., perhaps the code is a context-action pair) that is labeled with #turnleft, #CAP, and within Euclidean distance of forty meters of the center of a particular intersection (based on #X, #Y, and #Z) in order to obtain just left turn context-action pairs for a particular intersection.

In some embodiments, an abstract syntax tree may represent the determined 110, 120 first code and second code. The embodiments may use a generalization of Damerau-Levenshtein distance (DLD) to match parts of the abstract syntax trees. DLD may be implemented using a dynamic programming solution and/or implemented using a recursive search. Generalized DLD may apply not just to character strings but also to any part of an abstract syntax tree using the context of what is appropriate for each node, which can include unordered lists, ordered lists, associative arrays, etc. Labels can reduce the problem size by cutting off branches of the recursive search (based on label compatibility). For example, if a label matches exactly, other branches of comparison can be avoided entirely. Labels can also add to (or detract from) the weights of the matches which can improve the quality of the result and/or improve performance. Labels can also be used as in combination with a threshold to improve the quality of the results while also improving performance; for example, code with mismatched labels will not match unless it is 100% match and larger than a certain threshold size, in which case the code match overrides the label, or a threshold could be used which is a combination including number of label matches, number of label mismatches, code size, and code matching metrics. In some embodiments, if the labels are assigned to portions of the abstract syntax tree, the use of the labels can speed up graph matching.

In some embodiments, labels can be associated with a single value, as in the Euclidean distance example above, or with multiple values, characters or strings, objects, functions or other executable code, and/or the like. If a single value is associated with a label, then various premetrics, indexes, distances, divergences can be applied to the values (e.g., Euclidian distance discussed elsewhere herein). If multiple values are associated with a label, then similar premetrics can be applied. For example, a label #P could be associated with an (X, Y, Z) location tuple and be amenable to premetric distance calculations. If a label is associated with a character or a string, other premetrics can be used, such as Levenshtein distance or Hamming distance. If a label is associated with objects, functions, or other executable code, the premetric for the label may be based on any appropriate measure, such as identity of the code, output of the executable code, similarity metrics of the code, and the like.

In some embodiments, the value or other item associated with a label may be used in conjunction with the label itself in order to determine compatibility of a label. For example, a compatibility measure may require both the existence of identical labels (#X, #Y, and #Z), as well as a Euclidean distance below a certain threshold.

In some embodiments, labels can be hierarchical, depending on a single parent, or multiple. For example, #hardleft, #slowleft may be sublabels of #turnleft. #hardleft may also be a sublabel of #aggressivedriving and/or #makeuptime. Hierarchical labels may be used in the same way and provide the same benefits as other types of labels described herein.

In some embodiments, some of the labels can be "escaped out" or otherwise hidden. A sample syntax for this could be ##turnleft (note the double hash). An escaped-out label can take on many meanings. For example, it may be an indicator in a class (e.g., in an object-oriented programming language) that instantiations or further copies should contain the label. In some embodiments, escaping out a label indicated a lower weight (or higher weight, depending on the implementation), for the label. For example, a double hash may indicate that the label is a suggestion on the code, whereas a single hash may indicate that a label is a requirement (e.g., must match the label in order for code to be compatible 130).

In some embodiments, there can be security associated with one or more labels. This may be useful, e.g., when evolving code that is obtained from the Internet, or otherwise not trusted. In such situations, it could be that only a subset of labels from the secured code are available to for use in evolution with other code. Additionally, it could be the case that the secured code can only be evolved with other code though the interaction with a pre-defined set of labels, and other labels in the code may be ignored.

The first and second code can be checked for compatibility 130 based at least in part on the associated labels. Checking code for compatibility can take many forms. For example, in some embodiments, if a label is considered a "rule", then if the first and second label do not match that the compatibility 130 check stops there and process 100 returns to determine 110 and 120 more labels. In some embodiments, if a label is considered a "rule" it may be that if label one and label two match, no further checking is performed and the two code segments are considered compatible 130. In yet other embodiments, a "rule" label, if matched between the first and second code, may still require a check of the first and second code for compatibility. In some embodiments, "escaped" labels (e.g., ##turnleft) might be considered suggestions and non-escaped labels (e.g., #turnleft) might be considered rules. A check for compatibility of code may include checking the similarity of the code in any applicable manner, such as check based similarity after performing whitespace and variable name de-sensitivity, noise suppression for similar and identical functions (e.g., "sin( )", "sine( )", "SINE( )", etc.), position independence where appropriate (e.g., order of definition of variables is not an indicator of difference), etc.

Compatibility 130 of labels may also be based on comparison of more than one label on either or both of the first and second code. For example, the first code (a context-action pair, e.g.) may have therewith associated a #X, #Y, and #Z and #turnleft labels, and second code (another context-action pair, e.g.) may have therewith associated #P (a point in space) and #turnleft labels, and checking compatibility (e.g., are these two left turns that were made at the same intersection) may include checking the distance between the first and second code (based on the #X, #Y, and #Z vs. #P), and that they both have #turnleft labels. If the distance is less than a certain threshold (e.g., 50 or 100 feet), then the two may be considered "close enough" to be left turns at the same intersection. Comparing compatibility may also include comparing the compatibility of a single label with two or more labels on another section of code. For example, the first code (executable code) may have therewith associated #MATH_CALC and #SINE labels, and the second code (also executable code) may have therewith associated just a #sinusoid label. Determining compatibility may include determining that the non-identical #sinusoid label is related to the #SINE label, and that alone may be determined as sufficient for compatibility; and/or that the #sinusoid label is related to the #SINE label and the #MATH_CALC label. One the other hand, if the second set of code was labeled #sinusoid and #graphics_display, then it may be determined that the first and second sets of code are not compatible if the system assumes incompatibility between sections of code that are for mathematical calculation (#MATH_CALC, the first code) and those that are for graphical display of functions (#graphics_display, the second code).

As another example, a first program may have separate code for left turns (labeled #turnleft) and rights turns (labeled #turnright) and a second program may have a code that handles right and left turns (labeled just #turn and/or labeled #turnright and #turnleft). Comparing the code for compatibility may include determining whether the #turn label is compatible with either the #turnleft (or # turnright) labels. Checking compatibility 130 of the code may also include determining whether second code (form the second program) with #turn, #turnleft, and #turnright labels is compatible with first code (from the first program) labeled #turnleft (or #turnright). In some embodiments, the first code labeled with #turnleft may be determined to be compatible with the second code labeled #turn, #turnleft, and #turnright and the first and second code may be evolved together. For example, it could be the case that the compatibility determination is made in the affirmative because code for turning right is similar enough to code for turning left for the two to be combined. If, however, first code for turning left is not compatible with the second code for turning either direction from the second program, then the first code may be determined to be incompatible with the second code, notwithstanding that both could be used for turning left.

As alluded to above, compatibility 130 may also be determined based on queries, such as premetric, logical or Boolean, and other types of queries. For example, a distance premetric query may look at the values associated with labels (e.g., #X, #Y, and #Z) and determine a distance between the first and second code, or based on a distance to a known point (e.g., the Euclidean origin or any other point). In some embodiments, more complex queries can be used to determine compatibility. For example, the compatibility 130 test may be that the first and second code have the same #turnleft label, and meet a distance from the origin of a known intersection by forty meters as measured using #X, #Y, and #Z.

In some embodiments, hierarchical labels are used and compatibility 130 may be determined at least in part based on the hierarchy of labels one and two. In some embodiments, labels might be determined as compatible or at least more likely to be compatible even if not identical, if they are above (or below) in the same hierarchy. For example, a #turnleft label may have two children #hardleft and #softleft, and one parent #turn, which in turn has a parent label #navigate. In determining compatibility 130, a label may be considered a match with one or both of a parent and child label. So, a compatibility determination may be made (or more likely to be made) if the first code has a #turnleft label and the second code has one of the child (e.g., #had left) or parent (#turn) labels. The further-away labels (e.g., comparing #hardleft to great grandparent #navigate) may be given lower or no weight in making, or may preclude a compatibility 130 determination. In some embodiments, an exact match of the first and second label (two #turnlefts) might be given more weight than hierarchically-related labels (e.g., #turnleft with #hardleft).

In some embodiments, similar, but not identical labels might be matched. For example, #SIN and #SINE; and #turnleft and #turntotheleft might each be treated as similar, matching labels when making a compatibility 130 determination. In some embodiments, identical labels may be given the same weight as similar labels when making a compatibility 130 determination. In other embodiments, identical labels may be given a higher weight than labels that are only similar when making compatibility 130 determinations.

In some embodiments, a determination of compatibility 130 may only be performed if the security of the label and/or code is appropriate. For example, if only a certain set of labels is available to a particular input code (and/or access is limited to the code associated with those labels), a compatibility 130 determination may be made only if the labels being consider meet that security consideration. In some embodiments, the compatibility 130 determination will be performed, but will fail if a security consideration is not met.

In some embodiments, one segment of code will not be determined as compatible 130 with a second set of code if the second set of code is not labeled and/or if the code is labeled with a different (e.g. not similar) label. E.g., if one set of code is labeled with #turnleft and a second set of code is not labeled, or is labeled with #slowdown, then it will not be indicated as compatible 130.

If the first and second code are not compatible 130, subsequent sets of code and corresponding labels are determined 110 and 120. If the first and second code are compatible 130, then the first and second code are evolved 140 to produce third candidate code. Any appropriate technique for evolving code may be used. For example, the first and second code could be evolved 140 based on a combination of the first and second code, could be mutated before and/or after the combination of the first and second code, could be combined with other code (e.g. other than the first and second code), and the like.

Evolving 140 third candidate code from the first and second code can take many forms. Further, candidate code may be evolved from a single set of code, from two sets of code, as depicted in FIG. 1, or from three or more sets of code, etc. In some embodiments, two or more candidate code sets may be evolved 140 based on the one or more programs (not depicted in FIG. 1). For example, the techniques described with respect to evolving 140 and elsewhere herein could be used to produce two or more candidate code sets from either or both of the code sets for which labels were determined 110 and 120, from other or additional code sets, including evolving based on more than two code sets. Evolving the first and second code may include performing crossover, mutation, and the like on the first and second code in order to produce the third code. Evolving 140 code may also be termed 'determining' 140 code.

In some embodiments, evolving 140 code is accomplished by using a population of code sets that include executable, interpretable, or compilable code, or the like. This may include evolving 140 high-performing labeled executable code set with a compatible high-performing executable code set to produce further candidate executable code sets. These executable code sets may be compared or compatibility 130, then combined, evolved, mutated, etc. For example, in some embodiments, portions of the first code set and the second code set can be combined in order to produce the third code set (or an interim code set that is further modified). This combination can encompass selecting one of the two code sets, selecting portions of each code set (including more than a combined 100% of each code set), etc. For example, if the first and second code are each represented by portions of an abstract syntax trees (each with a compatible label at the top), evolving 140 the code may encompass taking all of one or the other of the labeled portions of the abstract syntax trees, or taking a portion of one abstract syntax tree and a portion of the other abstract syntax tree.

The labeled code may also be represented executable, interpretable, or compilable code. As a simple example, consider #TTT (Tic Tac Toe) labeled code sets that play a game of tic-tac-toe, where the tic-tac-toe board is addressed in this manner:

{(0,0) (0,1) (0,2)
 (1,0) (1,1) (1,2)
 (2,0) (2,1) (2,2)}

One code set for playing tic tac toe might perform the following steps (written in pseudo code):
a. Set 1:
i. if ISEMPTY(1,1), PLACESYMBOL (1,1)
ii. elseif ISEMPTY(0,0), PLACESYMBOL (0,0)
iii. elseif ISEMPTY(0,1), PLACESYMBOL (0,1)
iv. . . .
A second candidate executable code set might be
a. Set 2:
i. if ISEMPTY(0,0), PLACESYMBOL (0,0)
ii. elseif ISEMPTY(0,1), PLACESYMBOL (0,1)
iii. elseif ISEMPTY(0,2), PLACESYMBOL (0,2)
iv. . . .
Evolving 140 these two executable code sets may entail, combining the first code set and the second code set. For example:
a. Resultant code set Resultant.A:
i. (was 1.i) if ISEMPTY(1,1), PLACESYMBOL (1,1)
ii. (was 2.ii) elseif ISEMPTY(0,1), PLACESYMBOL (0,1)
iii. (was 2.iii) elseif ISEMPTY(0,2), PLACESYMBOL (0,2)
iv. . . .

The first and second code may also be mutated along various dimensions, either before or after it is combined as part of the evolution 140. Mutating may include new commands being inserted, commands being deleted or changed, variables being altered, etc. For example, the resultant haploid code set A might be mutated with respect to the parameters passed, such as replacing one of the integer parameters with a random integer (underlined for emphasis):
a. Mutated resultant haploid set A (only set):
i. (was 1.i) if ISEMPTY(1,1), PLACESYMBOL (1,1)
ii. (was 2.ii) elseif ISEMPTY(0, RANDOM_INTEGER(0 . . . 2)), PLACESYMBOL (0, RANDOM_INTEGER(0 . . . 2))
iii. (was 2.iii) elseif ISEMPTY(0,2), PLACESYMBOL (0,2)
iv. . . .

In many of the examples herein, two separate code sets are compared, and/or evolved 140 to form a single set of candidate code. In some embodiments, the sets of code sets each come from a separate source (e.g., two programmers named or teams led by Alicia or Bob), or more than two sources (e.g., programmers named or teams led by Alicia, Bob, Charles, etc.) In the embodiments where the code being evolved is from a single source (potentially even from a single computer program) code sets may be combined and evolved based on labels. For example, Alicia's single program might include multiple #turnleft-labeled code sections (either as part of a single program or from separate programs). In some embodiments, the labeled #turnleft code sections might be compared for compatibility 130, and a subset of those evolved 140 as discussed herein. Additionally, in some embodiments, there may be multiple code sets for a single programmer (e.g., Alicia or her team have programmed multiple mailcart programs, each with a #leftturn labeled section). In such embodiments, the multiple code sets may be compared, selected, and combined in a manner similar to what is described herein for multiple code sets from multiple programmers.

As discussed, the techniques herein also apply to code of more than two programmers or teams (e.g., Alicia, Bob, Charles, etc.). Consider for example, four code sets from Alicia, Bob, Charles, and Diane. The techniques herein may combine the code sets from any combination of Alicia, Bob, Charles, and Diane together, including comparing, selecting, and combining code sets of one programmer with those of the same programmer as described in the single-programmer context. When there are more than two code sets from multiple programmers, the labeled code sets from the programmers may be compared, selected, and evolved in various ways. For example, the code sets may be paired off and combined in pairs in a manner similar to that described for the two code set embodiments and examples. As another example, in some embodiments, more than two or all the code sets may be compared, pairs selected, and combined. For example, if a code set from Diane is compared against the code sets of Alicia, Bob, and Charles, there may be pairs selected that represent code sets from various combinations such as Diane:Alicia, Diane:Bob, and Diane:Charles. If this comparison is performed among all of the sets of code sets, then the possible combined pairs could be from all (or some subset of) combinations of Alicia, Bob, Charles, and Diane.

In some embodiments, the two received code sets for which labels were determined 110 and 120 can be combined and merged, can be mutated, etc. An example of evolution 140 might have two code sets, in this case context-action pairs, between #leftturnCAP-label context-action pairs from Alicia and Bob:

|  | Alicia #leftturnCAP | Bob #leftturnCAP |
|---|---|---|
| Left lane ("LL", Boolean) | 1 | 1 |
| Left Turn Signal On ("LT", Boolean) | 1 | 1 |
| Distance to Light ("DTL") | 120' | 110' |
| Speed of vehicle, MPH | 15 | DTL/10 |
| Action to be taken | Turn left at 0.7° | Turn left at 0.7° |

Combining these two code sets could take all identical elements between the two, and keep those. For the non-identical elements, the DTL and speed, one or the other might be chosen (at random or based on some other criteria), a random number between the two might be chosen, etc.

In various embodiments, code sets can also be mutated (before, after, or as part of evolving 140). For example, returning to the context-action pair example above, one or more of elements of the context or action may be mutated. This can be advantageous to give the population extra variance. If the resultant code after mixing Alicia and Bob above was written on the left, it might be mutated as shown on the right below:

|  | Result of cross-over between Alicia and Bob #leftturnCAP | After mutation |
|---|---|---|
| Left lane ("LL", Boolean) | 1 | 1 |
| Left Turn Signal On ("LT", Boolean) | 1 | 1 |
| Distance to Light ("DTL") | 112.5' | 99' |
| Speed of vehicle, MPH | 7.5 + DTL/20 | Speed = 1 + DTL/11 |
| Action to be taken | Turn left at 0.7° | Turn left at MAX (30°, 50/DTL °) |

As depicted, the mutation can be of the context and/or the action to be taken. Further, mutations can include replacing numbers or constants with functions and/or variables, and vice-versa, as well as replacing numbers with numbers or functions with functions. Such functions can be based on, for example, one of the context variables. As depicted above, the speed and action to be taken were each mutated to a function of DTL. In some embodiments, mutations may also include removing actions (leaving the action empty or making the action a NULL), as well as mutating NULL or empty actions to include an action.

Mutations may be done randomly, or based on "seeding" the system with various parameters. For example, those working on the system, such as programmers, operators, trainers, etc. may know that the angle of a turn should increase and the speed should decrease the closer a vehicle gets to making a turn, but not know which function is correct. So, they may provide seed functions or general constraints, and the system may "experiment" with various functions that use those seed function and/or meet those general constraints. For example, the system may be seeded with various functions or portions of functions for turn angle, for example, the system could be seeded that the turn angle is likely the function of one or more of sin(speed), cos(speed), 1/speed, 1/DTL, speed, DTL, min(0°), max (30°), etc. Then the system could insert one or more of these elements to make functions for the left turn angle. This could be done while taking into account the candidate code (Alicia's, Bob's, or a mixture thereof), or may be independent of the candidate code.

In some embodiments, the mutations are a resampling of numbers in the context and/or action. For example, the resampling of numbers in the context and/or action may simply be varying the code set numbers using any function, including: sampling within a set percent, sampling the numbers over the observed range of the numbers, or resampling using a maximum entropy distribution with a mean at the number from the original code. As an example of maximum entropy distribution, if a number from the context or action is known to be nonnegative but no other domain knowledge is known about the distribution of that number in other contexts/actions, a resample may consist of drawing a random number from the maximal entropy distribution for a nonnegative number for a given mean, namely an exponential distribution, whose mean is represented by the original number from the context or action. For example, just looking at the sample from Alicia, the distance to the light might be resampled using a maximum entropy distribution with mean of 120', which might result in a DTL of 112.5'. Further, if the code set has certain observed properties, then the mutated number may be constrained to meet those properties. For example, if observed values are positive, the system may maintain the mutated value as a positive value. If the observed values are integers, the system may maintain the mutated value as an integer.

If something is known about the domain, it can be used in the system to hold the mutations within those known constraints. As such, in some embodiments, the system can allow a domain expert to constrain parts of the context and/or the action. For example, if it is known that Left Lane (LL) is Boolean, then the system can constrain any mutations to being either 0 or 1 (or True or False, depending on the implementation).

In some embodiments, the system may include per-context-field modifiers or constraints. These can be the same or different between code sets. These modifiers might act on the data in the code set. Such actions might be a Get (e.g., clamp), Mutate (e.g., force resampling in a certain range), or Mix (e.g., average for two inputs, return one or the other), or another function or constraint. These modifiers can be useful in instances where one might want to override the default way in which the system operates. Further, modifiers might be useful, for example, when you want the code set to abide by certain constraints, even if the experts or programmers did not abide by those constraints. One such example is abiding by speed limits or norms. Modifiers might be used to clamps the speed of the training drivers. For example, Alicia's code set may have a modifier that clamps speed between 0 and 50 MPH, and Bob may have the same constraint, or a different constraint such as clamping speed between −10 and 45 MPH. Any training value outside those constraints may be clamped back to those values. When the modifiers are the same between two candidate code sets being combined, the system may simply include the modifier unchanged. If they are different, then the modifiers might be mixed or bred in a manner similar to that described the above. For example, the modifier for Alicia and Bob's speed might be averaged (clamp between −5 and 47.5 MPH) or resampled in any other way. Modifiers might also be mutated in manners similar to that described above.

In some embodiments, when two code sets are mixed or bred as part of evolving 140, or elsewhere, a portion of each is used, resulting in a "whole" or 100% code. For example, in a particular instance, the system may use 40% of Alicia's code and 60% of Bob's, resulting in a 100% or whole code. In some embodiments, the resulting code may be constructed based on more (or less) than 100% combined. For example, the system may use a combined 110% (70% Alicia and 40% Bob), or more, of the candidate code sets. Using more than 100% combined code may be advantageous when the evolutionary aspects of the mutation might remove portions of the context and/or action, remove a link between the context and the action, and/or make part of the context invalid. For example, the mutation might remove the indication of LL, or Left Lane, from the context. If it turns out that the removed portion of the context is actually needed for proper performance, it could be useful for there to be a way to reintroduce elements, such as using more than 100% combined of the candidate code sets. Generally, combining together more than 100% of two candidate code sets, might be implemented as a Boolean "OR" of the two code sets in order to maintain any pieces that are unique to each code, or possibly 80-100% of the Boolean OR of the two trees. Further, in some embodiments, it will be useful to keep all of both sets of each code, notwithstanding that there could be some duplication of context variables.

As discussed elsewhere herein, labels may be related in a hierarchical relationship. In some embodiments, hierarchical labels can help used to evolve 140 code sets by filling gaps in code where some of the hierarchy of labels is present in the code and other parts of the hierarchy are not. Returning to the mailcart example, if #hardleft and #slowleft are sublabels of #turnleft, and code has only labels #turnleft, then the techniques herein may use that information to match or add code to fill out those missing sublabels. For example, if the first candidate code has #leftturn and #slowleft, and the second candidate code has #leftturn and #hardleft, then the compatibility score may be high (and the code may later be evolved 140) in order for the evolved 140 code to have all of the hierarchy #leftturn, #slowleft, and #hardleft.

After evolving 140 the first and second code to produce the third code, a check is made whether there is more 150 code to evolve. If there is, process 100 returns to 110, if no, then the process 100 is done 160 evolving code.

Evolving Programs Utilizing Context Indications

Figure 2:
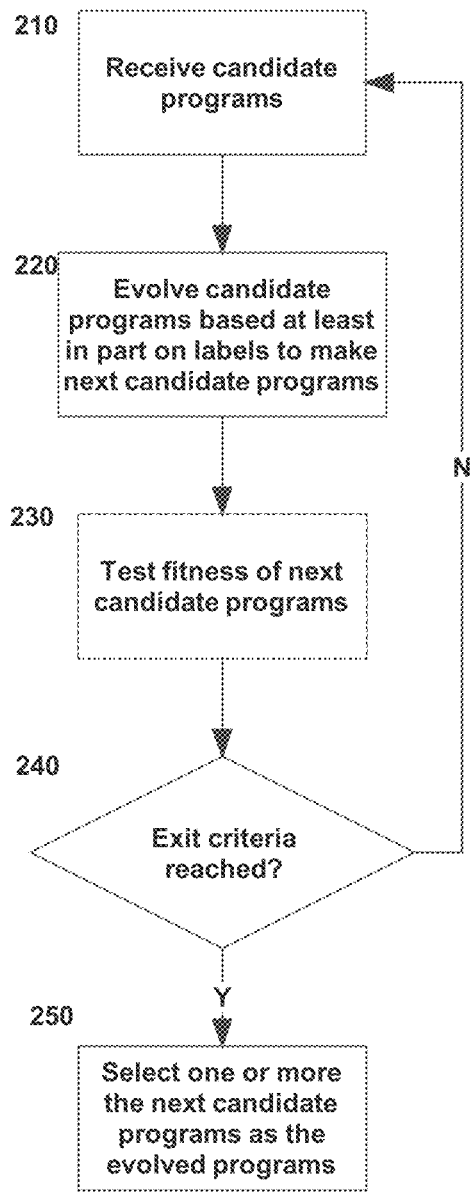
FIG. 2 depicts a process for evolving programs utilizing context indications.

FIG. 2 depicts a process 200 for evolving programs utilizing context indications. Candidate programs are received 210, and evolved 220 based at least in part on labels within the candidate code. The evolution 220 of the code produces candidate programs. The fitness of the evolved programs can be optionally tested 230. If exit criteria (e.g., fitness or some other measure or standard) are reached 240, then one or more candidate programs are selected 250. Otherwise, the process 200 returns to receive 210 more candidate programs.

Candidate programs are received 210 in process 200. The receipt 210 of candidate program may entail selecting a candidate program from storage 330 or 340 by evolution control engine 310, receipt at evolution control engine 310 (or other system, device, or process) over a network 390 (e.g., by downloading code from the Internet, receiving code sent or submitted by a submitter—not pictured in FIG. 3), and the like. The received 210 candidate programs may perform the same or similar function. For example, the candidate programs received may be two versions of a mailcart program discussed in examples herein.

The received 210 programs can either or both be executable code and/or data. For example, the received 210 candidate programs could be set of context-action pairs representing actions taken in certain contexts, produced by one or more trainers. The received 210 programs could also be executable programs, such as an executable mailcart control engine. Further, the received 210 programs could be a combination of the training sets of context-action pairs and executable programs to control the execution of a self-driving mailcart. Various code within the received 210 programs may be labeled. Labels on code are discussed extensively herein. The labels used on code in one received program may or may not overlap with the labels in a second received program. Further, identical or similar labels may be used in multiple received 210 programs.

The received 210 candidate programs are evolved 220 based at least in part on labels, and the result is other or "next" candidate programs. Examples of evolving candidate programs are discussed with respect to FIG. 1, process 100, and elsewhere herein. As an example, evolution control engine 310 may receive 210 candidate programs to evolve 220. The evolved 220 or "next" candidate programs may be stored in memory associated with evolution control engine 310 and/or other storage 330, 340, or another device, process, system, or engine 320.

In some embodiments, after the candidate programs are evolved 220, resulting in next candidate programs, they might be tested for fitness 230. Testing a program for fitness 230 is optional and may not be done in all embodiments. In some embodiments, testing a program for fitness 230 can vary by the domain of the candidate programs and can be a measure of performance of the candidate programs as compared to other candidate programs. Testing for fitness may include calculating a fitness score for a candidate program. For example, a fitness function may be a measure of the speed, processing efficiency, or some other measure of performance. Further, a fitness score might be modified at random, to introduce additional variation. A fitness score may also be calculated based in part on fitness scores of "parent" candidate program. For example, if a set of evolved context-action pairs has parent sets of context-action pairs A', A" and B', B" going back two "generations", then the fitness score may be a function of the current set of context-action pairs fitness and the fitness scores of A', A", B', and B". Further, the effect or contribution of the patents' and other ancestor fitness scores may phase out over time. For example, in some embodiments, the parents' fitness score may be multiplied by a coefficient less than one and added to the current fitness score multiplied by one minus the first coefficient. Since the scores from the generation(s) before the parents would have also been included in the parents' scores and multiplied by a coefficient less than one, those scores would be further reduced in impact in the current and each subsequent generation. An example equation would be Score[i]=(1−B)*Fitness[i]+B*Sum$_j$(Scores[i−1,j]), where Fitness[i] is the current fitness score, $0 \leq B \leq 1$, and Score[i−1,j] is the (j) parents' scores. Additionally, if a candidate set of context-action pairs remains or is otherwise a candidate for more than one generation, its own fitness score from previous generations may also be used in addition to its fitness score from the current generation. For example, a current fitness score may be a weighted sum of the fitness score from the current generation and the fitness score from the previous generation, such as 0.5*current_generation_fitness+0.5*previous_generation_fitness. For example, in the example of the mailcart program above, the fitness function may be a function of one or more of travel time, smoothness of ride, whether there were any accidents or errors, etc.

If exit criteria are reached 240, then the evolved 220 candidate programs may be selected 250. Selecting 250 a program may include or be associated with indicating that the candidate program can be used in production, as part of a self-driving car reasoning engine, simulator, game, program. Further, after selection 250 of the candidate program, it may be further tested or evolved by techniques herein or other means, etc.

As apparent from the description herein, the techniques can be applied to code merging in scenarios far more complex than typically achievable by known revision control techniques. Imagine you had 3 or more development teams (led by Alicia, Bob, and Charles) and told them to all write code that did the same thing, and that they just had to annotate their code with the respective labels. With traditional branching and merging, this would be impossible and/or the results would be non-functional. However, using the techniques herein the multiple code sets could be evolved to produce better (more fit) code than any one of the teams.

Figure 3:
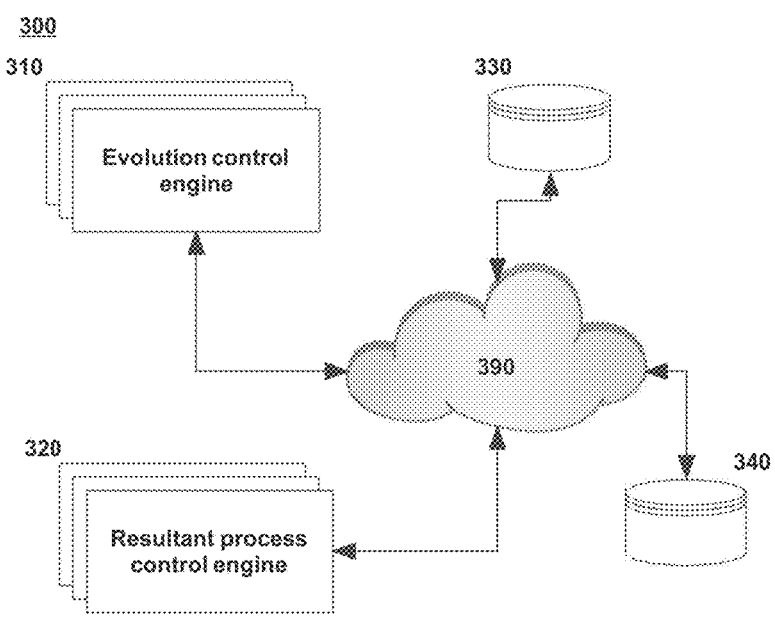
FIG. 3 depicts an example system for evolutionary programming techniques utilizing context indications.

Example System for Evolutionary Programming Techniques Utilizing Context Indications FIG. 3 depicts an example system for evolutionary programming techniques utilizing context indications. System 300 includes elements connected by a communicative coupling or network 390. Examples of communicative coupling and networks are described elsewhere herein. In some embodiments, the processes 100 and 200 of FIGS. 1 and 2 may run on the system 300 of FIG. 3 and/or the hardware 400 of FIG. 4. For example, the described functions of process 100 and/or process 200 may be performed by evolution control engine 310 (and/or resultant process control engine 320). The selected, evolved programs might be stored at evolution control engine 310, resultant process control engine 320 and/or communicatively coupled storage 330 or 340. A resultant process control engine 320 may execute the candidate programs produced by processes 100 and/or 200.

Each of evolution control engine 310 and resultant process control engine 320 may run on a single computing device, multiple computing devices, in a distributed manner across a network, on one or more virtual machines, which themselves run on one or more computing devices. In some embodiments, evolution control engine 310 and resultant process control engine 320 are distinct sets of processes running on distinct sets of computing devices. In other embodiments, evolution control engine 310 and resultant process control engine 320 are intertwined or share processes or functions and/or run on the same computing devices. In some embodiments, storage 330 and 340 are communicatively coupled to evolution control engine 310 and resultant process control engine 320 via a network 390 or other connection. Storage 330 and 340 may also be part of or integrated with evolution control engine 310 and/or resultant process control engine 320 via a network 390 or other connection.

As discussed herein the various processes 100, 200, etc. may run in parallel, in conjunction, together, or one process may be a subprocess of another. Further, any of the processes may run on the systems or hardware discussed herein.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
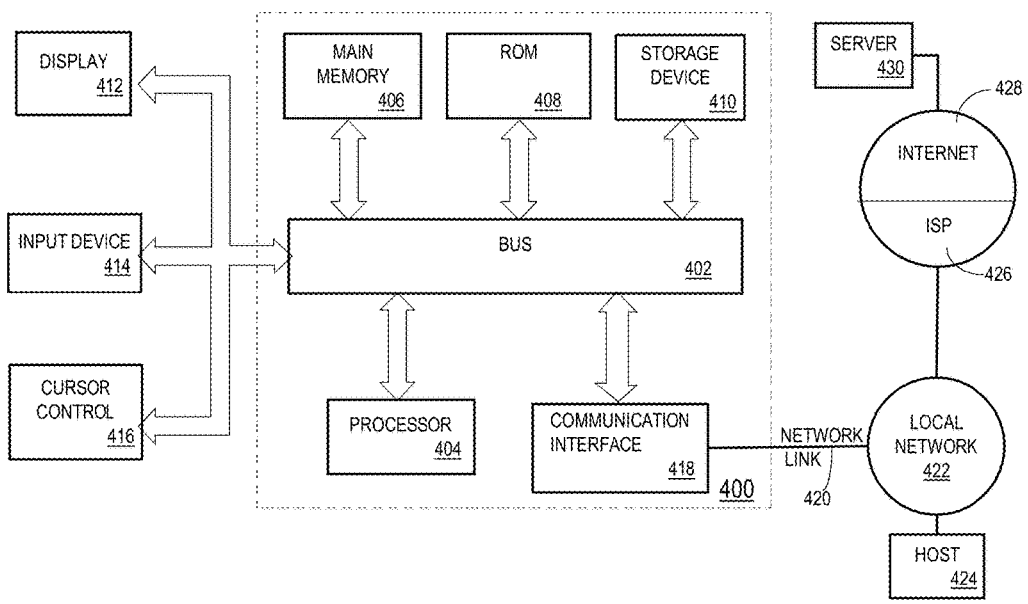
FIG. 4 depicts examples systems and hardware for evolutionary programming techniques utilizing context indications.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as an OLED, LED or cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. The input device 414 may also have multiple input modalities, such as multiple 2-axes controllers, and/or input buttons or keyboard. This allows a user to input along more than two dimensions simultaneously and/or control the input of more than one type of action.

Computer system 400 may implement the techniques described herein using customized hard-wired logic, one or more ASICs or FPGAs, firmware and/or program logic which in combination with the computer system causes or programs computer system 400 to be a special-purpose machine. According to some embodiments, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium storing instructions which, when executed by one or more computing devices, cause the one or more computing devices to perform a process of:
   determining a first label associated with functionality of first candidate code;
   determining a second label associated with functionality of second candidate code;
   determining whether the first candidate code and second candidate code are compatible for evolution based at least in part on the first label and the second label;
   when the first candidate code and the second candidate code are determined to be compatible for evolution based at least in part on the first label and the second label, evolving third candidate code, using evolutionary programming techniques, based on the first candidate code and second candidate code, wherein the third candidate code differs from both the first candidate code and second candidate code, and contains no more than a subset of code from each of the first candidate code and the second candidate code;
   performing a fitness test based at least in part on the third candidate code;
   determining whether exit criteria are met based at least in part on the fitness test; and
   when the exit criteria are met, providing the third candidate code as evolved code and causing execution of the evolved code,
   wherein:
   the first candidate code comprises a first context-action pair comprising two or more first context elements;
   the second candidate code comprises a second context-action pair comprising two or more second context elements; and
   wherein evolving the third candidate code based on the first candidate code and second candidate code comprises:
   when a first context element of the first one or more context elements is different from a corresponding second context element of the second one or more context elements, evolving a third, evolved context element from the first context element and the second context element;
   including in the third candidate code the third, evolved context element.

2. The non-transitory computer readable medium of claim 1, wherein the process further comprises determining a resultant program based at least in part on the third candidate code; determining whether the exit criteria are met based at least in part on the resultant program; and if the exit criteria are met, providing the resultant program as an evolved program.

3. The non-transitory computer readable medium of claim 2, wherein the process further comprises:
   determining whether the second label does not occur in a first candidate executable program associated with the first candidate code; and
   when the second label does not occur in the first candidate executable program, determining the resultant program based at least in part on the second candidate code.

4. The non-transitory computer readable medium of claim 2, wherein the resultant program is executable and determining the resultant program comprises determining the resultant program based on the third candidate code and a first candidate executable program associated with the first candidate code.

5. The non-transitory computer readable medium of claim 2, wherein determining whether the resultant program meets exit criteria comprises determining whether the resultant program meets exit criteria based at least in part on a fitness measure for the resultant program.

6. The non-transitory computer readable medium of claim 1, wherein the process further comprises, when the first candidate code and second candidate code are not compatible, evolving the third candidate code based at least in part on first candidate code without the second candidate code.

7. The non-transitory computer readable medium of claim 1, wherein determining whether the first label and the second label are compatible comprises determining a premetric based at least in part on the first label and the second label.

8. The non-transitory computer readable medium of claim 1, wherein determining whether the first candidate code and the second candidate code are compatible comprises determining whether there is an exact match between the first label and the second label.

9. The non-transitory computer readable medium of claim 1, wherein the first candidate code is associated with a first set of two or more labels and the second candidate code is associated with a second set of one or more labels, and determining whether the first candidate code and the second candidate code are compatible comprises determining whether the first set of two or more labels is compatible with the second set of one or more labels.

10. The non-transitory computer readable medium of claim 1, wherein determining whether the first candidate code and the second candidate code are compatible comprises determining a measure of compatibility based on the first label, the second label, the first candidate code, and the second candidate code.

11. The non-transitory computer readable medium of claim 1, wherein the process further comprises selecting the first label based at least in part on access control security associated with the second candidate code.

12. The non-transitory computer readable medium of claim 1, wherein the first candidate code comprises one or more of a first training context-action pair and first candidate executable code.

13. A method comprising:
   determining a first label associated with functionality of first candidate code;
   determining a second label associated with functionality of second candidate code;
   determining whether the first candidate code and second candidate code are compatible for evolution based at least in part on the first label and the second label;
   when the first candidate code and the second candidate code are determined to be compatible for evolution based at least in part on the first label and the second label, evolving third candidate code, using evolutionary programming techniques, based on the first candidate code and second candidate code, wherein the third candidate code differs from both the first candidate code and second candidate code, and contains no more than a subset of code from each of the first candidate code and the second candidate code;
   performing a fitness test based at least in part on the third candidate code;
   determining whether exit criteria are met based at least in part on the fitness test; and
   when the exit criteria are met, providing the third candidate code as evolved code and causing execution of the evolved code, wherein:
the first candidate code comprises a first context-action pair comprising two or more first context elements;
the second candidate code comprises a second context-action pair comprising two or more second context elements; and
wherein evolving the third candidate code based on the first candidate code and second candidate code comprises:
when a first context element of the first one or more context elements is different from a corresponding second context element of the second one or more context elements, evolving a third evolved context element from the first context element and the second context element;
including in the third candidate code the third evolved context element,
wherein the method is performed on one or more computing devices.

14. The method of claim 13, further comprising,
determining a resultant program based at least in part on the third candidate code;
determining whether the exit criteria are met based at least in part on the resultant program;
when the exit criteria are met, providing the resultant program as an evolved program.

15. A system for executing instructions, wherein said instructions are instructions which, when executed by one or more computing devices, cause performance of a process including:
determining a first label associated with functionality of first candidate code;
determining a second label associated with functionality of second candidate code;
determining whether the first candidate code and second candidate code are compatible for evolution based at least in part on the first label and the second label;
when the first candidate code and the second candidate code are determined to be compatible for evolution based at least in part on the first label and the second label, evolving third candidate code, using evolutionary programming techniques, based on the first candidate code and second candidate code, wherein the third candidate code differs from both the first candidate code and second candidate code, and contains no more than a subset of code from each of the first candidate code and the second candidate code;
performing a fitness test based at least in part on the third candidate code;
determining whether exit criteria are met based at least in part on the fitness test; and
when the exit criteria are met, providing the third candidate code as evolved code and causing execution of the evolved code,
wherein:
the first candidate code comprises a first context-action pair comprising two or more first context elements;
the second candidate code comprises a second context-action pair comprising two or more second context elements; and
wherein evolving the third candidate code based on the first candidate code and second candidate code comprises:
when a first context element of the first one or more context elements is different from a corresponding second context element of the second one or more context elements evolving a third, evolved context element from the first context element and the second context element;
including in the third candidate code the third, evolved context element.

16. The system of claim 15, wherein the first candidate code is associated with a first set of two or more labels and the second candidate code is associated with a second set of one or more labels, and determining whether the first candidate code and the second candidate code are compatible comprises determining whether the first set of two or more labels is compatible with the second set of one or more labels.

17. The system of claim 15, wherein determining whether the first candidate code and the second candidate code are compatible comprises determining a measure of compatibility based on the first label, the second label, the first candidate code, and the second candidate code.

* * * * *